United States Patent [19]
Callahan

[11] 3,742,757
[45] July 3, 1973

[54] CELL FOR MEASURING STRESSES IN PRESTRESSED CONCRETE

[75] Inventor: Joseph C. Callahan, Oak Ridge, Tenn.

[73] Assignee: The United States of America as represented by the United States Atomic Energy Commission, Washington, D.C.

[22] Filed: Oct. 18, 1972

[21] Appl. No.: 298,740

[52] U.S. Cl. .............................. 73/88.5 R, 73/88 C
[51] Int. Cl. ............................................. G01b 7/16
[58] Field of Search ................ 73/88 C, 88.5, 88 R, 73/398 AR

[56] References Cited
UNITED STATES PATENTS 3,461,416  8/1969  Kaufman ....................... 73/398 AR
3,314,034  4/1967  Caris ............................... 73/88.5 R Primary Examiner—James J. Gill
Assistant Examiner—Anthony V. Ciarlante
Attorney—Roland A. Anderson

[57] ABSTRACT

A compact embedment device has been provided for determining changes of stress in prestressed concrete structures. Stress forces are applied to opposite sides of the cell whereby a deflection of an internal member is proportional to the stress. Any changes are detected by variations in the output of strain gages attached to the internal member. Temperature effects are nullified by using titanium as a material of construction, and periodic drift checks may be made with an internal pneumatic ram actuated from an external air pressure source.

5 Claims, 3 Drawing Figures

CELL FOR MEASURING STRESSES IN PRESTRESSED CONCRETE

BACKGROUND OF THE INVENTION

The present invention was made during the course of, or under, a contract with the United States Atomic Energy Commission.

The subject development relates generally to instruments for monitoring the condition of concrete structures and more paricularly to a device for measuring the change of stress in prestressed concrete structures.

Prestressed concrete is commonly utilized in many types of structures in the building trades and, most recently, in vessels for the enclosure of nuclear reactors. The relaxation of stresses in such structures is an important phenomenon to assess because of the effect upon design parameters. It is used, for example, to permit a higher stress state in a structure than could be permitted if only based upon elastic analysis. The problem has been, however, that no satisfactory compact device has been developed to study the relaxation of the stress over long time periods and at elevated temperatures in actual structures and/or models of such structures.

SUMMARY OF THE INVENTION

It is therefore the principal object of the subject development to provide an embedment cell for the accurate measurement of the change of stress in a prestressed concrete structure such as a nuclear reactor vessel.

Another object of this invention is to provide a stress measurement cell for prestressed concrete structures with means for recalibration of the device in situ.

Briefly, the invention is a concrete stress measuring device for embedment in a prestressed concrete structure comprising: a generally disk-shaped hermetically sealed housing having an inner compartment therein with planar end wall surfaces; a cruciform beam rigidly mounted at the ends of at least two extending arms thereof with said compartment in a plane parallel to and laterally spaced from said planar surfaces, said housing having a centrally located projection therein contacting said beam so that flexures of said device from changes in stresses of said concrete structures are transmitted to said beam; a network of strain gages mounted on at least two adjacent legs of said beam for measuring the flexures of said beam from stress applied thereto through said housing and providing electrical output signals indicative of the stresses present at the embedment location of said device in said concrete structures; and means for transmitting and recording the output signals from said gage at a location external of said concrete structures.

Other objects and many of the attendant advantages of the present invention will be apparent from the following detailed description of the invention taken in conjunction with the accompanying drawings.

DETAILED DESCRIPTION

Figure 1:
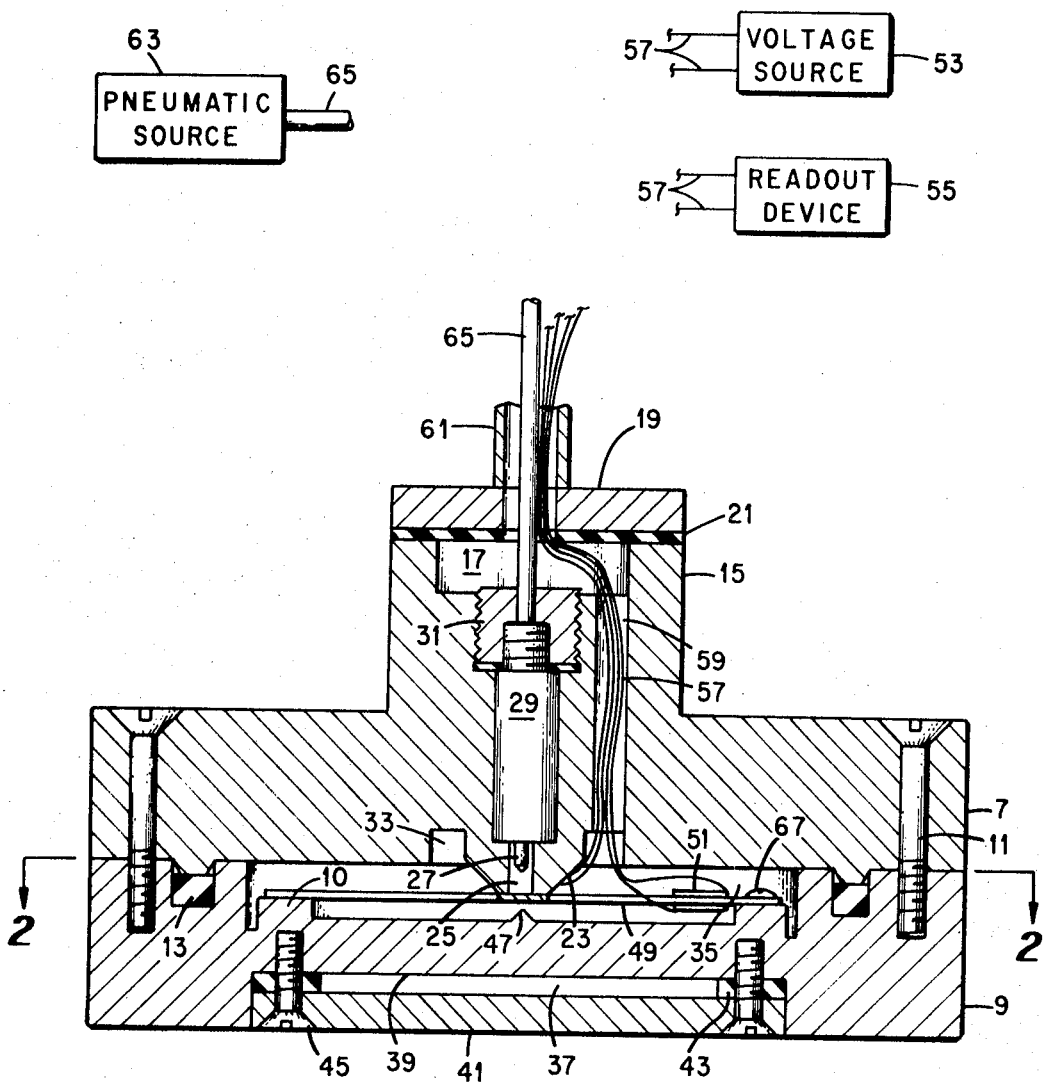
FIG. 1 is a cross sectional view of a stress cell according to the present invention.

Referring now to FIG. 1, the stress cell is preferably made of two primary body members: a top plate 7 and a bottom plate 9, both being generally cylindrical. They are joined by bolts 11, or other suitable means, and a seal 13 is provided therebetween. Centrally located on the outside of top plate 7 is a cylindrical collar 15, with an internal cavity 17, which is closed by a cover plate 19 and seal 21. The opposite (inner) face of top plate 7 is provided with a central projection 23. Projection 23 is provided with a central passageway 25 to receive a plunger 27 of a pneumatic ram 29 which is secured by a bushing 31 in cavity 17. Surrounding projection 23 is an annular recess 33 in the inner surface of top plate 7.

Bottom plate 9 is provided with central disk-like cavities 35, 37 on the inner and outer surfaces, respectively, to leave a central web 39. The exterior surface of web 39 is protected from forces normal to its surface by a cover plate 41 and seal 43 held with bolts 45. The opposite (inner) side of web 39 is provided with a centrally located reference projection 47. Cover plate 41 prevents the deflection of web 39 by the compressive forces applied to the top of the cell. Mounted within cavity 35, but normally spaced from projection 47, is a cruciform beam 49 having networks of conventional foil-type electrical resistance strain gages 51 bonded to the top and bottom of at least two legs of the cruciform beam 49 orthogonal to one another. A preferred strain gage is the 350.0 ohm type WK-06-125AD-350 supplied by Micromeasurements, Inc., which has a gage factor of 2.07 ± 1.0 percent and 0.125 in gage length. The strain gages are connected in a conventional full bridge arrangement to an external voltage source 53 and readout device 55 by means of electrical leads 57 passing through a hole 59 in top plate 7 and thence through cavity 17 into an access tube 61 attached to cover 19 about a central opening therein. Pneumatic ram 29 is attached to a pneumatic source 63 by a tube 65 which also passes through tube 61 to a point exterior of the concrete structure.

Figure 2:
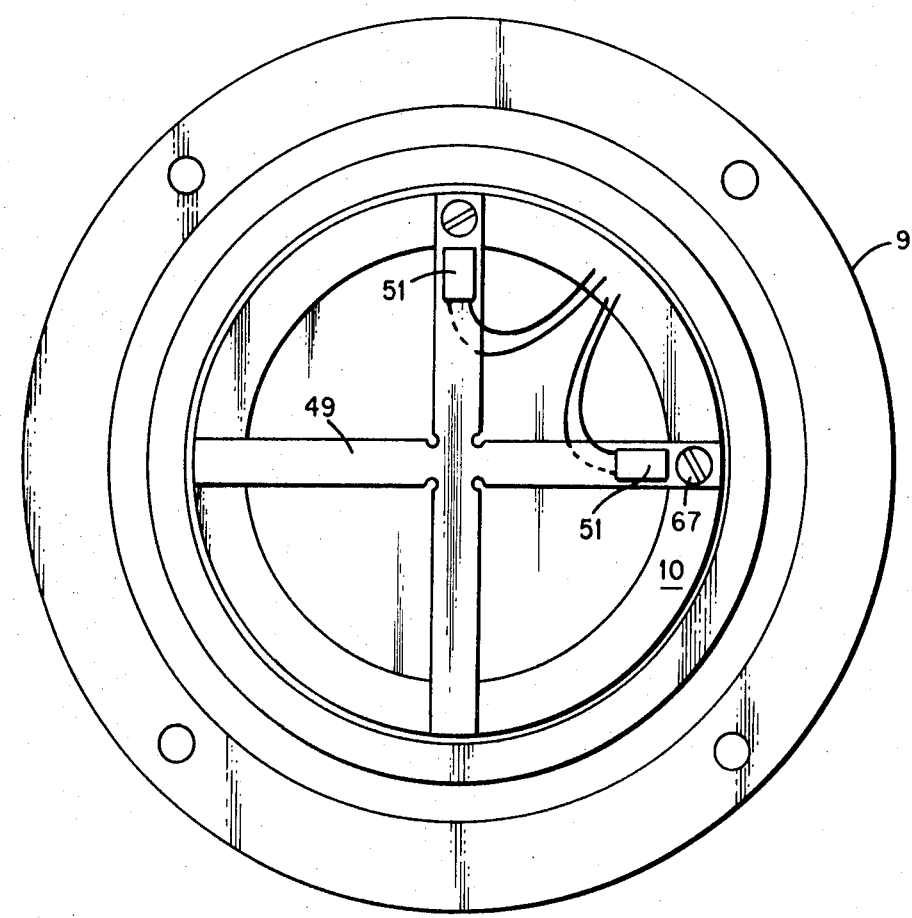
FIG. 2 is a plan view of a body member of the cell showing the interior containing the stress sensing element with the top plate removed.
Figure 3:
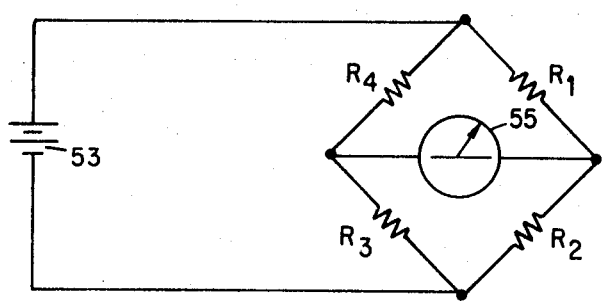
FIG. 3 is a schematic wiring diagram of resistive strain gages mounted on the stress sensing element of FIG. 2.

The inner surface of bottom plate 9 is shown more clearly in FIG. 2. The cruciform beam 49 is attached to bottom plate 9 with screws 67 at the ends of two adjacent arms so that the beam contacts an annular raised portion 10 at the extensions of each of the four legs. The full bridge arrangement allows measurement of bending strains in the beam independent of thermal and axial strains. The wiring of the four gages paired as $R_1$ and $R_2$ on top and bottom of one leg, and $R_3$ and $R_4$ on top and bottom of the other leg of the cruciform beam is shown in FIG. 3.

In a normal operation of the subject development in a prestressed concrete pressure vessel, for example, the cell is assembled so as to be hermetically sealed and is embedded in a concrete structure as it is cast. Stresses within the prestressed concrete structure are applied by means of the prestressing of the structure, the result of the heat-up of the inside of the structure and finally by the pressuring of the vessel. These stresses tend to compress the cell axially resulting in a deformation of the cruciform beam 49 by the top plate projection 23 which is normally in contact with beam 49. The signal through leads 57 is indicative of this deformation as determined by the strain gage bridge and conventionally recorded on the readout device 55, such as a galvanometer as shown in FIG. 3. As the stresses in the concrete are relaxed through aging or other processes, this becomes apparent via a change in the output signal which may be a continuous monitoring process or periodic sampling. Periodically a test may be performed to determine any drift in the response of the equipment. This test is accomplished by activating the pneumatic ram 29 by means of activating the source 63 whereby the cruciform beam 49 is deflected to a maximum position against reference projection 47 forming a fixed stop position and recording the output of the strain gages. This reference point reading remains independent of the externally applied stress for essentially all loadings.

Although the cell may be constructed from various metals depending on the application, it has been found that titanium metal construction is preferred for cells used in concrete structures which are subjected to excessive heating. Because titanium has substantially the same thermal coefficient of expansion as concrete, no thermally-produced stresses occur within the cell as a result of differential expansion between the cell and the concrete.

Overall dimensions of the unit may typically be 1½ inches thick and 3 inches in diameter, the beam 49 being 0.020 inch thick by 1⅞ inches in length. The cell should be hermetically sealed by means of the various seals to prevent deterioration of the internal parts of the cell.

Stress cells constructed as described above were subjected to a series of events simulating, on a reduced time scale, the history of a prestressed concrete reactor vessel from the time of casting of the concrete structure, through prestressing, heating and pressurization. A series of eight of the stress cells was employed in the model. After 90 days of curing, the model was prestressed with the stress cells monitoring stresses up to approximately 1,600 psi. The model was subjected to a 75° F temperature cross-fall. Maximum stresses recorded during this phase were approximately 2,300 psi. Finally, the model was subjected to a 700 psi internal pressure which reduced the stresses seen by the cells to a maximum of approximately 1,500 psi. This combined prestressing, heating and pressurization condition was maintained for approximately 180 days with the stress cells being monitored periodically during this period.

While the particular stress cell herein described is well adapted for carrying out the objects of the present invention, it will be obvious to those skilled in the art that various modifications and changes may be made in the cell without departing from the scope of the following claims.

What is claimed is:

1. A concrete stress measuring device for embedment in a prestressed concrete structure comprising:
   a generally disk-shaped hermetically sealed housing having an inner compartment therein with planar end wall surfaces;
   a cruciform beam rigidly mounted at the ends of at least two extending adjacent arms thereof within said compartment in a plane parallel to and laterally spaced from said planar surfaces, said housing having a centrally located projection therein contacting said beam so that flexures of said housing from changes in stresses within said concrete structure are transmitted to said beam;
   a network of strain gages mounted on at least two adjacent legs of said beam for measuring the flexures of said beam from stresses applied thereto through said housing and providing electrical output signals indicative of the stresses present at the embedment location of said device in said concrete structure; and
   means for transmitting and recording the output signals from said gages at a location external of said concrete structure.

2. The stress measuring device as set forth in claim 1 further including a resilient mounted cover disposed over a substantial portion of the outer surface of one end wall so as to prevent the application of stress forces to said beam other than through contact of said projection therewith.

3. The stress measuring device as set forth in claim 2 further including means actuated from a source external of said concrete structure for producing a fixed deflection of said beam to check the calibration of said device.

4. The stress measuring device as set forth in claim 3 wherein said means for producing a fixed deflection of said beam includes a pneumatic ram mounted coaxially with said projection in the end wall opposite said one end wall of said housing and having a plunger actuated by said ram to deflect said beam against a fixed stop formed by a projecting portion of said one end wall, an actuating pneumatic pressure source disposed outside of said concrete structure and a pneumatic line connecting between said source and said ram.

5. The stress measuring device as set forth in claim 4 wherein said device housing and said beam are made of titanium metal.

* * * * *